UNITED STATES PATENT OFFICE.

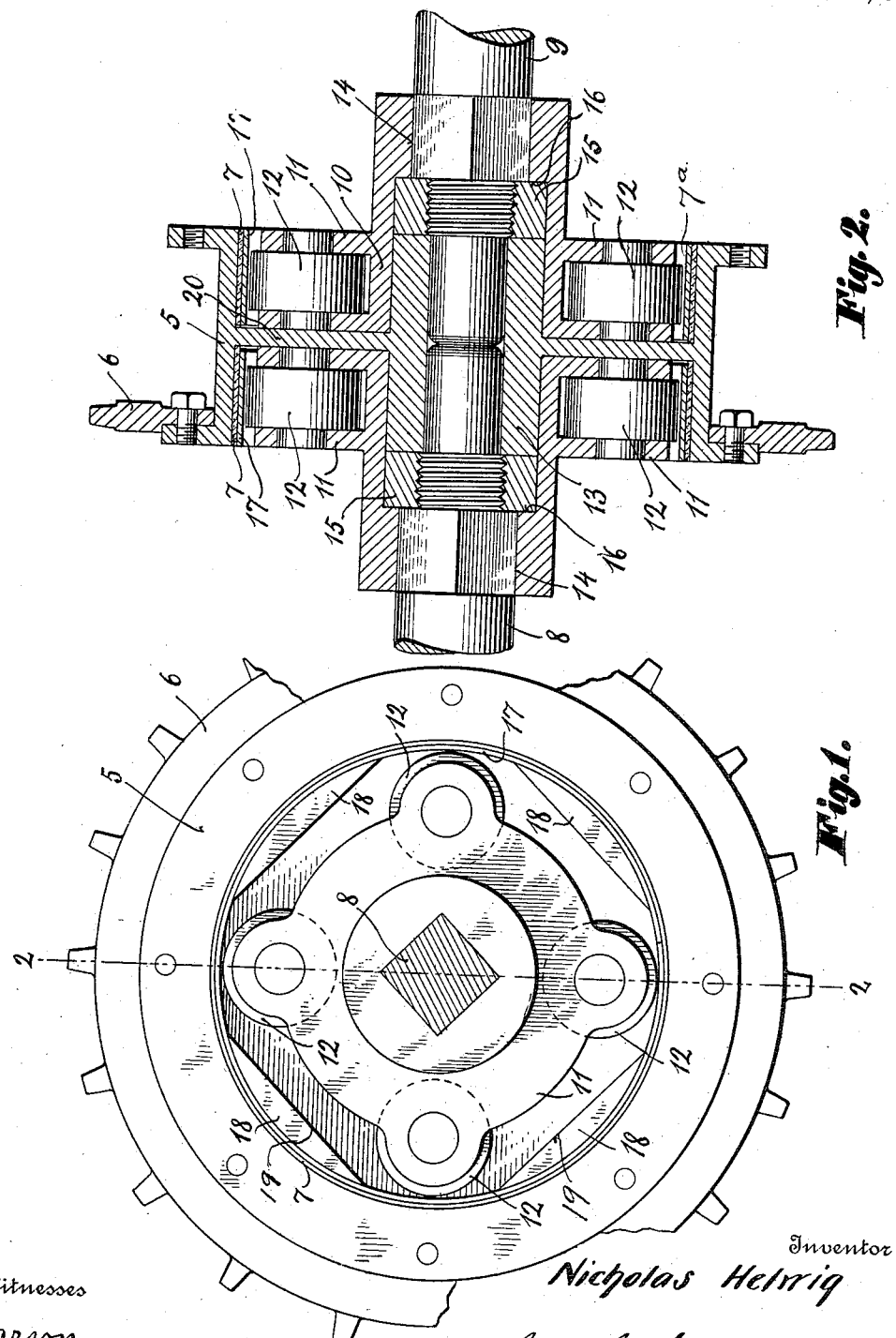

NICHOLAS HELWIG, OF MIDDLETOWN, OHIO.

DRIVING MECHANISM.

1,016,941.  Specification of Letters Patent.  Patented Feb. 13, 1912.

Application filed July 18, 1911. Serial No. 639,129.

*To all whom it may concern:*

Be it known that I, NICHOLAS HELWIG, a citizen of the United States, residing at Middletown, in the county of Butler and State of Ohio, have invented certain new and useful Improvements in Driving Mechanism, of which the following is a specification.

The clutch which is the subject of the present invention is designed more particularly for transmitting power from the motor to the driving wheels or axle of motor vehicles; and its object is to provide a simple and efficient mechanism which will transmit power in either direction, and which permits either one of the wheels to overrun when the vehicle makes a turn.

In the accompanying drawing forming a part of this specification, Figure 1 is an elevation of the mechanism, and Fig. 2 is a vertical section thereof on the line 2—2 of Fig. 1.

Referring specifically to the drawing, the driving member comprises a drum 5 which is provided with a suitable gear 6 by which it is driven from the motor. The rim of the drum has an annular inner friction surface 7 which is engageable by the clutch rings to be presently described. The friction surface may have a fiber lining 7ª as shown.

The two sections of the axle are indicated at 8 and 9, respectively. Each axle section carries a clutch device comprising a hub 10 having a number of radial projections 11 which are forked, and between the branches of which are journaled rollers 12. The hub 13 of the drum 5 fits loosely in the bores of the hubs 10, and the latter have reduced portions 14 which are squared in cross section. The axle sections are squared for a short distance to fit in the squared portions 14 of the hubs 10, whereby said hubs are connected to the respective axle sections, so as to rotate the same when the clutch device is connected to the driving drum 5, said clutch device being placed co-axial with the drum. The inner ends of the axle sections extend loosely into the hub 13 and have adjacent thereto short threaded portions to receive thrust rings 15, the latter being located between the ends of the hub 13 and shoulders 16 in the bores of the hub 10. Between the rollers 12 of the respective clutch devices and the friction surface 7 are interposed split friction rings 17 to the inner peripheries of which are fitted at regular intervals segmental blocks 18 forming cam surfaces 19 into the path of which the rollers 12 extend, so that they may be engaged thereby for the purpose of spreading the rings and bringing the latter into frictional engagement with the surface 7. The driving drum 5 is divided centrally into two parts by a web 20, extending between the hub and the rim of the drum. The clutch devices are located on opposite sides of this web.

The operation of the mechanism is as follows: Fig. 1 of the drawing shows the position of the parts before the axle sections are locked to the driving drum 5, this being the position when the drum is not in motion. The rings 17 are held normally in frictional contact with the surface 7 by their resiliency, so that they will rotate with the drum. However, the frictional contact is not such as to prevent the rings from slipping around on the friction surface under certain conditions as will be presently described. When the drum starts to rotate, the cam surfaces 19 approach the rollers 12, and upon engaging the same, a wedging action takes place which expands the rings 17 and clamps them tightly against the friction surface 7 with sufficient force to lock them thereonto. The rollers now cannot advance farther, as they are located a greater distance from the center than the cam surfaces 19. The clutch devices are, therefore, locked to the drum and the motion of the latter is transmitted to the axle sections 8 and 9. When the vehicle makes a turn, the outer wheel travels faster than the drum 5, in view of which, the rollers 12 of the clutch device of said wheel will creep forwardly and thus become disengaged from the cam surfaces 19, whereupon said clutch device is released and the wheel is permitted to overrun. If the rollers creep sufficiently to engage the next cam surfaces ahead, the ring will slide around with the clutch device and the wheel will continue to overrun. As soon as the turn has been made, and the wheel starts to lag behind the driving drum, the ring 17 again takes hold of the friction surface 7 and is carried around by the same until the cam surfaces again engage the rollers, whereupon the clutch device is again locked to the drum and the motion thereof transmitted to the wheel. The herein described actions take place irrespective of the direction in which the drum is rotating.

I claim:

1. The combination of a driving member having an annular friction surface, a ring normally in frictional engagement with said surface but free to slide thereon, a driven member and means for clamping the ring to the friction surface to lock the driving and driven members together when the former is in motion.

2. The combination of a driving member having an internal annular friction surface, an expansible ring normally in frictional engagement with said surface but free to slide thereon, a driven member, and means for expanding the ring to lock the driving and driven members together when the former is in motion.

3. The combination of a driving member having an internal annular friction surface, an expansible ring normally in frictional engagement with said surface but free to slide thereon, a driven member, and coöperating devices on the rings and the driven member for expanding the ring to lock the driving and driven members together when the former is in motion.

4. The combination of a driving member having an internal annular friction surface, an expansible ring normally in frictional engagement with said surface but free to slide thereon, a driven member, and coöperating devices on the ring and the driven member for expanding the ring to lock the driving and driven members together when the former is running in either direction.

5. The combination of a driving member having an internal annular friction surface, an expansible ring normally in frictional engagement with said surface but free to slide thereon, the inner surface of the ring having cams, a driven member, and means carried by the driven member and engageable by the cams for expanding the ring to lock the same to the driving member when the latter is in motion.

6. The combination of a driving member having an internal annular friction surface, an expansible ring normally in frictional engagement with said surface but free to slide thereon, the inner surface of the ring having cams, a driven member, and rollers carried by the driven member and engageable by the cams for expanding the ring to lock the same to the driving member when the latter is in motion.

7. The combination of a driving member having an internal annular friction surface, an expansible ring normally in frictional engagement with said surface but free to slide thereon, the inner surface of the ring having cams, a driven member, and means carried by the driven member and engageable by the cams for expanding the ring to lock the same to the driving member when the latter is in motion, said means being located between the cams and engageable by the latter irrespective of the direction of rotation of the driving member.

8. The combination of a driven member having an internal annular friction surface, an expansible ring normally in frictional engagement with said surface but free to slide thereon, the inner surface of the ring having segmental blocks, a driven member, and means carried by the driven member and engageable by the chords of the segmental blocks for expanding the ring to lock the same to the driving member when the latter is in motion.

9. The combination of a driving member having an internal annular friction surface, an expansible ring normally in frictional engagement with said surface but free to slide thereon, the inner surface of the ring having segmental blocks, a driven member, and means carried by the driven member for expanding the ring to lock the same to the driving member when the latter is in motion, said means being located between the blocks.

10. The combination of a driving drum having an internal annular friction surface, an expansible ring normally in friction engagement with said surface, but free to slide thereon, a hub loosely mounted on the hub of the drum and having a shoulder in its bore, coöperating devices on the ring and the first mentioned hub for expanding the ring to lock said hub and the drum together when the latter is in motion, an axle carried by the first mentioned hub and rotatable therewith, said axle extending loosely into the bore of the drum hub, and a thrust ring mounted on the axle between the aforesaid shoulder and the end of the drum hub.

In testimony whereof I affix my signature in presence of two witnesses.

NICHOLAS HELWIG.

Witnesses:
R. R. WOLVERTON,
W. L. CURTIS.

Copies of this patent may be obtained for five cents each, by addressing the "Commissioner of Patents, Washington, D. C."